United States Patent
Murray

(10) Patent No.: US 7,243,341 B2
(45) Date of Patent: Jul. 10, 2007

(54) SCRIPTING LANGUAGE FOR PROCESSING TYPED STRUCTURED DATA

(75) Inventor: Eric Murray, Los Gatos, CA (US)

(73) Assignee: NVIDIA Corporation, Santa Clara, CA (US)

(*) Notice: Subject to any disclaimer, the term of this patent is extended or adjusted under 35 U.S.C. 154(b) by 634 days.

(21) Appl. No.: 10/136,055

(22) Filed: Apr. 29, 2002

(65) Prior Publication Data

US 2003/0204638 A1    Oct. 30, 2003

(51) Int. Cl.
G06F 9/44 (2006.01)
G06F 15/16 (2006.01)

(52) U.S. Cl. ............... 717/136; 717/115; 709/231; 709/246

(58) Field of Classification Search .......... 717/114, 717/115, 136, 139; 341/50; 709/231, 246, 709/247
See application file for complete search history.

(56) References Cited

U.S. PATENT DOCUMENTS 5,504,891 A * 4/1996 Motoyama et al. ......... 715/513
5,892,950 A * 4/1999 Rigori et al. ............... 717/146
6,158,031 A * 12/2000 Mack et al. ................ 714/724

OTHER PUBLICATIONS

"ASN1C and ASN1CPP Support for Information Objects and Parameterized Types," Jul. 2000, Objective Systems, Inc., (15 pages).*

* cited by examiner

Primary Examiner—Tuan Dam
Assistant Examiner—Eric B. Kiss
(74) Attorney, Agent, or Firm—Patterson & Sheridan, L.L.P.

(57) ABSTRACT

A method and apparatus for encoding/decoding between interchange format data and structured data utilizes a scripting language. The structure of the data can be controlled by the sequence of commands in the script and changes to the structure can be implemented by changing the script. A parser/interpreter is the only software necessary to implement the technique.

11 Claims, 4 Drawing Sheets

SCRIPTING LANGUAGE FOR PROCESSING TYPED STRUCTURED DATA

BACKGROUND OF THE INVENTION

Computer programs often need to share information contained in data structures. Various interchange formats have been developed to provide a means to share information stored in data structures. One widely utilized format is ASN.1, developed as formal notation for describing data transmitted by telecommunications protocols, regardless of language implementation and physical representation of these data, whatever the application, whether complex or very simple.

ASN.1 sends information in any form (audio, video, data, etc.) anywhere it needs to be communicated digitally. ASN.1 only covers the structural aspects of information and is not a programming language.

Typed, structured interchange format data (e.g., ASN.1 encoded data) is usually encoded and decoded using a library of functions. Each time a message is sent it must be ASN.1-encoded by the sender and decoded at the receiver.

In the most general sense, the sender is the program that needs to encode data into the shared data format and the receiver is the program that needs to decode the data in the shared data format.

Each library function knows how to encode/decode a particular object. The library functions are assembled into a program, either by hand or by a compiler, that represents the structure of the data to be dealt with, which reads the structure definition, and produces a program from it.

The problems with this are:

Modifying the encoding or decoding (for example, adding a new object in the data structure) requires a recompile. Additionally, the use of library functions results in a lot of code, which takes up a lot of space.

Doing ASN.1 by hand requires significant knowledge of both ASN.1 and the library functions that deal with the objects. Using a compiler often requires some hand-tweaking, which requires knowledge of the ASN.1 compiler vendor's library functions that deal with the objects.

Accordingly, the industry needs efficient techniques for decoding between interchange format data and data structures.

BRIEF SUMMARY OF THE INVENTION

According to one embodiment of the invention, scripts are used to control the encoding of structured data into typed interchange format data and the decoding of interchange format data into structured data.

According to another embodiment of the invention, an interpreted script language directs a simple script interpreter/interchange format parsing engine. An interpreter/parsing engine knows how to parse the scripts, and how to parse individual interchange format objects. The knowledge of how the interchange format objects are assembled into a data structure is captured in the scripts. Encoding into the interchange format is done by passing the interpreter an encode script and a data structure containing the structured data to be encoded in the interchange format. A change in the data structure requires only changing the script, not recompiling. The interpreter/parsing engine is a fairly small amount of code. Adding more interchange format data structures means adding scripts, while the interpreter does not change According to another aspect of the invention, commands in the script create a linked list having a number of elements, each holding data characterizing a decoded component. Each element in the linked list includes peer and subordinate pointers to allow nesting of components.

According to another embodiment of the invention, the script includes flow control commands such a test, loop and skip to allow flexibility in creating data structures.

According to another embodiment of the invention, an encode script creates encoded message data based on structured data.

According to another embodiment of the invention, the encode script includes commands for appending encoded data to named variables.

Other features and advantages of the invention will be apparent in view of the following detailed description and appended drawings.

DETAILED DESCRIPTION OF THE INVENTION

The invention will now be described with reference to various embodiments. A first embodiment is described, by way of example, not limitation, in the context of encoding/decoding between structured data in the C language and the ASN.1 (Abstract Syntax Notation One) notation as the interchange format.

Figure 1:
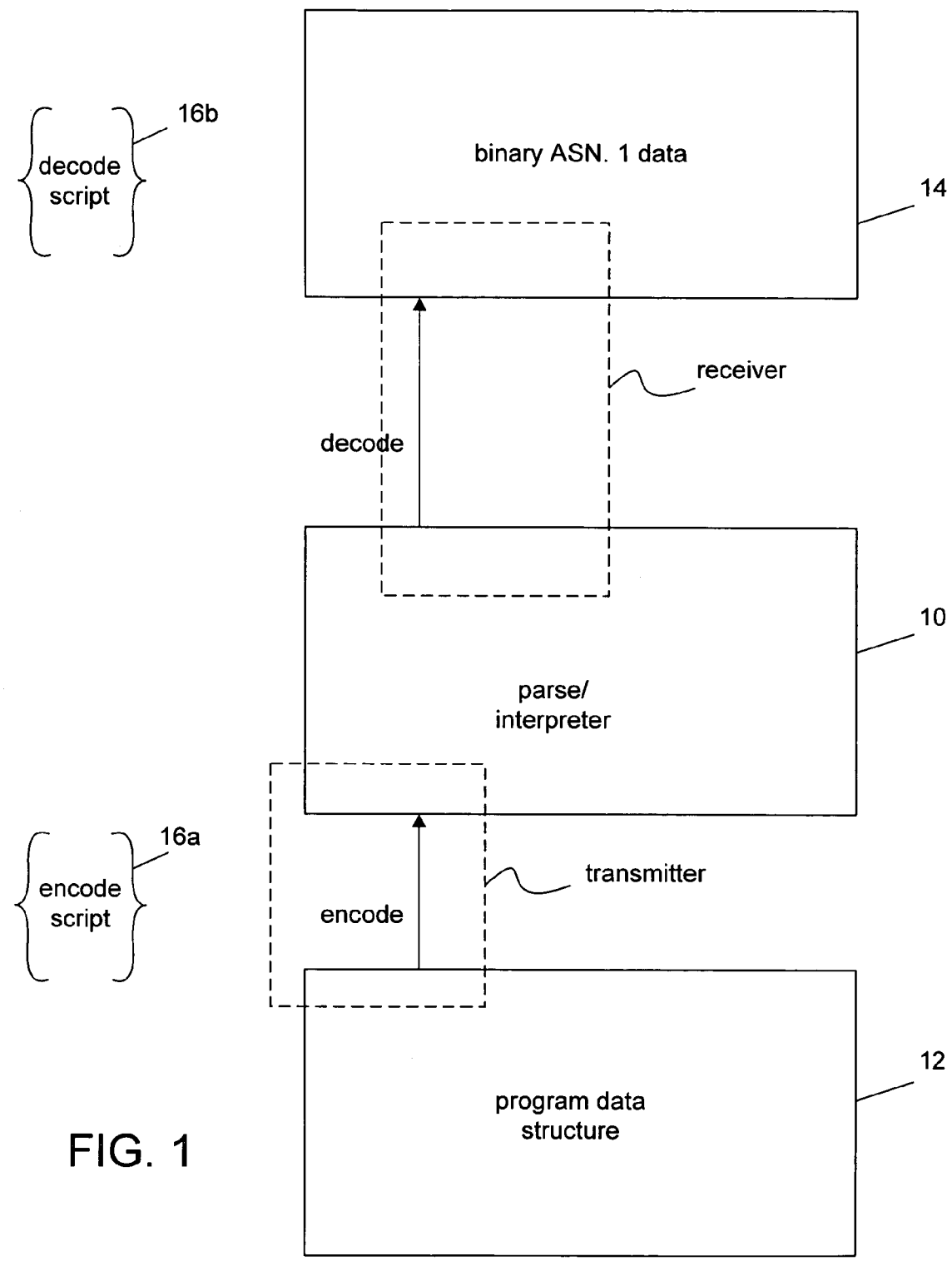
FIG. 1 is a block diagram of a preferred embodiment of an encoding/decoding system that utilizes a script.

An abstract block diagram of this embodiment is depicted in FIG. 1. An interpreter/parsing engine 10, in this embodiment a module of C code, transforms between a C data structure 12 and an ASN.1 binary message 14 under control of encode and decode scripts 16*a* and *b* written in a scripting language described more fully below.

The data structure is encoded into ASN.1 message data at a transmitter and the ASN.1 message data is decoded at a receiver.

The decoding operation will be described first. The parser/interpreter 10 decodes an ASN.1 object in the ASN.1 binary message 14 and then reads the next command from the script 16. If the command is a save command and the current ASN.1 object's type matches the type argument (and optionally the tag) then the ASN.1 object is saved in a linked list. Each node in the list can have two branches, the peer and subordinate branches. A peer is an object which is in the same structure as the current object, i.e. they are both in a SEQUENCE. A subordinate is an object which is at the next lower level.

Figure 2:
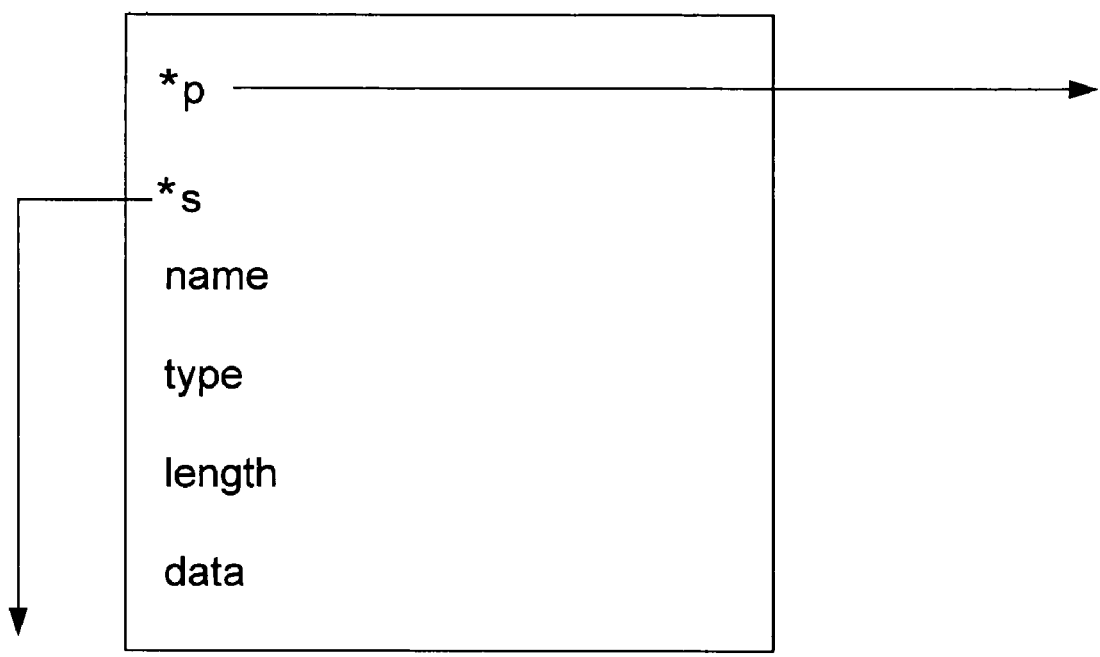
FIG. 2 is block diagram of a node in the linked list.

The structure of each node in the linked list is depicted in FIG. 2. Each node is a structure including either a peer pointer (@) or a subordinate pointer (s) and also includes name, type, length, and data fields. The peer pointer of a current node points to a node storing an object which is in the same structure as the object stored in the current node. The subordinate pointer points to a node storing an object which is in the next lower level. The use of these pointers and the structure of the linked list is illustrated below.

The following is an example of an ASN.1 grammar that can be decoded utilizing this embodiment of the invention.

```
blat ::= SEQUENCE {
    foo INTEGER
    blort Blort
}
blort ::= SEQUENCE {
    flibble INTEGER,
    flooble OCTET
}
```

Blat.blort would be a peer of blat.foo, and blat.blort.flibble would be a subordinate of blat.blort. Blat.blort.flooble is a peer to blat.blort.flibble.

During execution of the script, when the current ASN.1 object is saved or skipped, the next ASN.1 object is decoded and becomes the current object. No other commands can directly cause the object to increment, but they can call either save or skip. Once the script is finished, the interpreter returns the decoded tree to the caller, who can then use an access function to find objects in the tree:

asn_object*ap_lookup(asn_object*ao, char*cmd)

Usage:

asn_object*ao, *tree;

asnscript(&tree,asn_bitstream,script);

ao=ap_lookup(tree,"blat.blort.flibble");

printf("blat.blort.flibble=% d",ao->d.smallinteger);

Note that when decoding, integers that are smaller than size of (long) are decoded automatically as a convenience, and placed in smallinteger.

Figure 3:
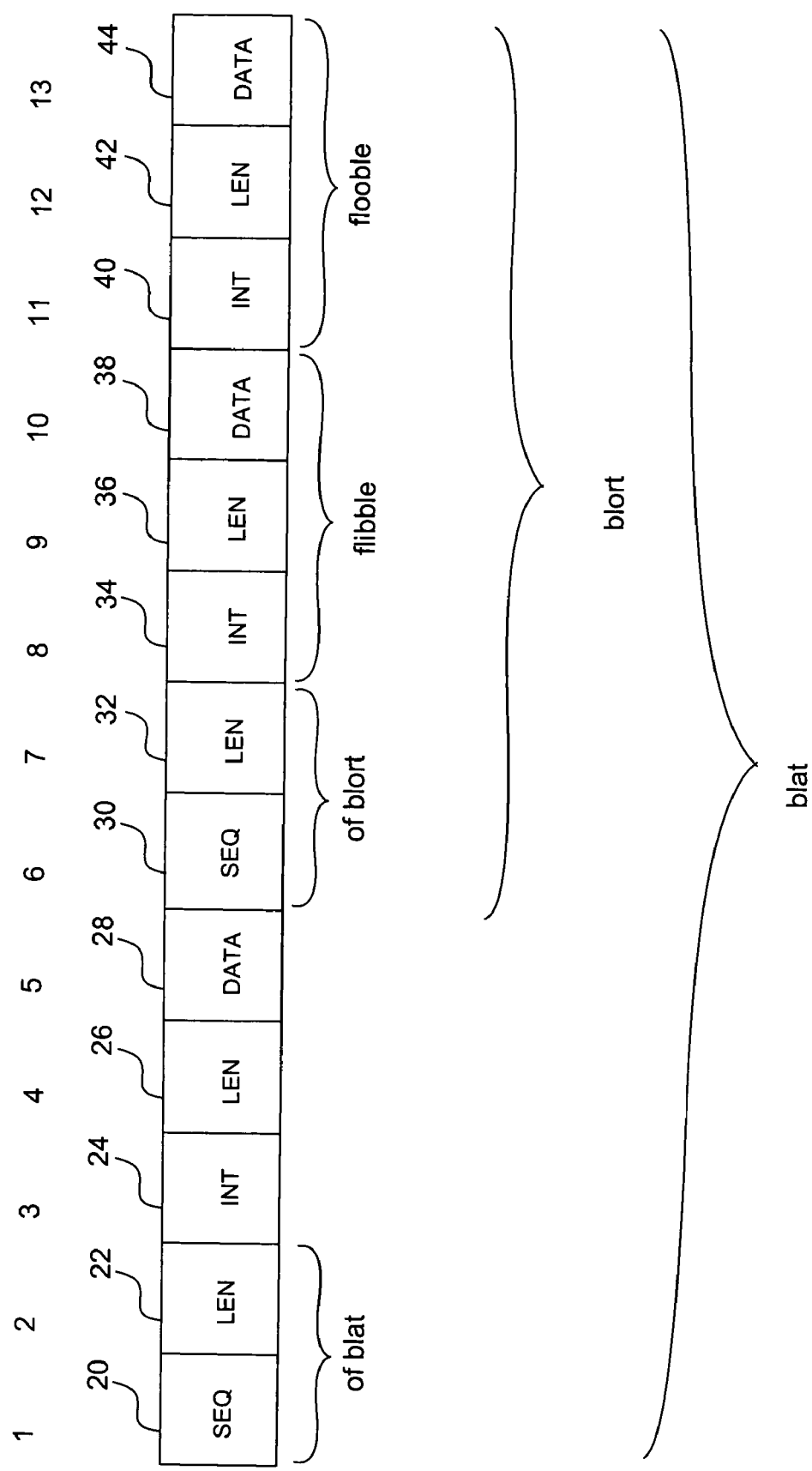
FIG. 3 is block diagram depicting the structure of an ASN.1 message.

The ASN.1 message data for the above example is depicted schematically in FIG. 3. Each object can include TYPE, LENGTH, and DATA fields. In FIG. 3 the first and second fields 20 and 22 are the TYPE and LENGTH fields for the blat Sequence. The LENGTH field is the length of the entire blat sequence which includes the blort sequence as a subordinate object. The third, fourth, and fifth fields 24, 26, and 28 are TYPE, LENGTH, and DATA for the foo object. The sixth and seventh fields 30 and 32 are the TYPE and LENGTH fields for the blort sequence. The eighth, ninth, and tenth fields 34, 36, and 38 are the TYPE, LENGTH, and DATA fields for flibble, and the eleventh, twelfth, and thirteenth fields 40, 42, and 44 are the TYPE, LENGTH, and DATA fields for flooble.

The ASN.1 components can also include an optional context sensitive tag that allow tests to be performed on the component.

The utilization of the scripting language of the currently described embodiment to decode the example will now be described. The following script would be used to generate a linked list data structure for the ASN.1 message data depicted in FIG. 3.

```
save blat Sequence {
    save foo Integer
    save blort Sequence {
        save flibble Integer
        save flooble Octet
    }
}
```

Figure 4:
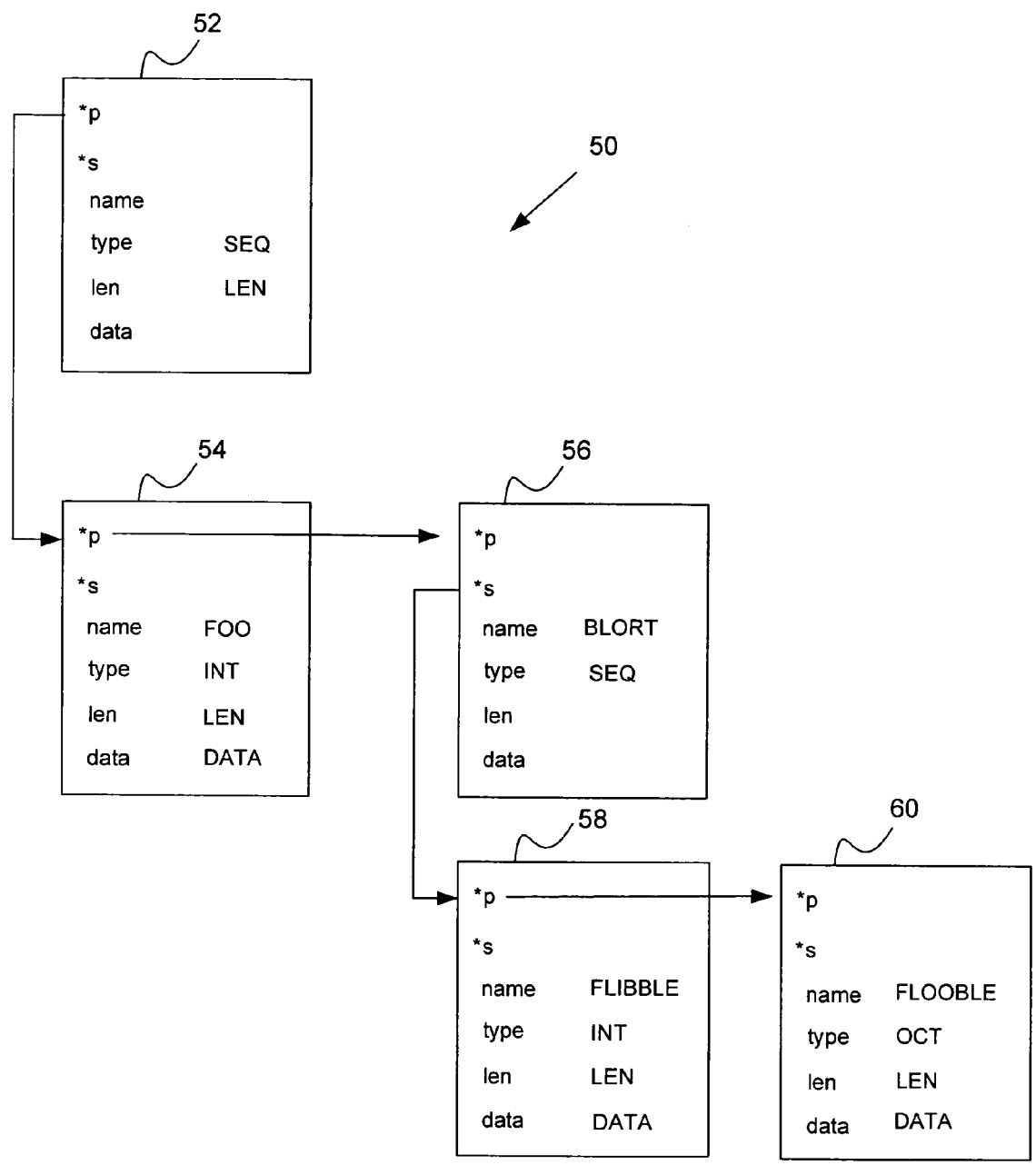
FIG. 4 is block diagram of a linked list generated by the decoding operation of a preferred embodiment.

The structure of the linked list 50 resulting from the application of the script to the ASN.1 data in FIG. 3 is depicted in FIG. 4.

The first line of script is: save blat SEQUENCE {; which causes a first new struct asn_object 52 to be added to the linked list. Its type would be Sequence and its name field would contain "blat".

The next object is linked as a subordinate. The second line of the script is: save foo INTEGER; which causes a second new struct asn_object 54 to be added to the last object's subordinate list. Its type would be Integer and its name field would contain "foo".

The next line of the script is: save blort SEQUENCE {; which causes a third new struct asn_object 56 to be added to the linked list. Its type would be Sequence and its name field would contain "blort".

The next object would be linked as a subordinate. The next line of the script is: save flibble INTEGER; which causes a fourth new struct asn_object 58 to be added to the subordinate linked list. Its type field would be Integer, and its name field would be "flibble". If flibble was a small integer, it would be decoded immediately and the value written to d.smallinteger in the native format. Otherwise, its length and its data would be put in d.vec.

The next object would be linked as a peer. The next line of the script is: save flooble OCTET; which would cause a fifth new object 60 named flooble to be saved, linked into the peer list of the last object.

The last line of the script is:}; which would cause the 'current' object to revert to the last member of the peer list of the previous subordinate.

Once the complete ASN.1 message is decoded, then the various objects in a linked list can be referred to by their names, e.g., "blat.blort.flibble" or "Certificate.Validity.notBefore.UTCTime".

The syntax of an embodiment of scripting language will now be described in detail. The general syntax in this document is of the form: command <argument> [option]; where command is a literal command word or phrase; <argument> is an argument to be filled in by the script writer; and [option] denotes an optional argument.

The command for saving the current object has the following syntax: save <Name> <Type> ["[<tag>]"] [optional] [else throw <Error>] [{other commands}]If the current object is not Type, throw the default Error or the Error if defined. If the "optional" keyword is present, then continue. If the current object is Type (and [tag] if specified), save it named Name. If there is a trailing '{', then the_next_object is a subordinate, not a peer. If Name has a trailing '#' character, the '#' will be replaced with a number denoting the order of this object inside a SET or SEQUENCE. This is useful for repeating sequences of some number of objects or structures, for example inside a relative distinguished name.

The command for incrementing the object has the following syntax: skip <Name> <Type> [else throw <Error>]. If the current object is Type, don't save it. If the current object is not Type, throw the default Error or the Error if defined.

The command for defining a subroutine has the following syntax: sub <subroutine name> { }. It defines a subroutine to be called later. The subroutine command can advance the current object.

The command for defining an error routine has the following syntax: error <error name> { }. The current object is valid when the error routine is entered. Error handlers do not return. Error handlers and subroutines share the same namespace.

The command for defining a test has the following syntax: if <Type>|[<tag>] {something}[elif{something else} [elif {yet more stuff}]]. If the current object is of the type, or explicitly tagged with [tag], then do something. Else do something else. If none of the if or elif conditions are true, do yet more stuff. The following is an example showing the use of the various codes:

```
if SEQUENCE {
    call dostuff
}
elif [0] {
    skip tag
    save INTEGER
}
```

The command for calling a subroutine has the following syntax: call <subroutine name>. When the subroutine returns, it will return to the next line in the script. It may advance the current object.

The command for looping inside a sequence has the following syntax: while in sequence <Name>{ } [else throw <Error>]. While inside the current SEQUENCE (or SET), loop over the instructions inside the brackets. If the loop executes without save commands being run (i.e. there's an ASN.1 object which has no save command that names it) then an error is thrown.

print <message to print>

This command prints out message to print. Everything on the line after the print command is printed. System variables to be printed can be inserted.

Current supported system variables are:

| | |
|---|---|
| $lineno | the current line number; |
| $ap.type | the type of the current parsed ASN.1 object; |
| $ap.last | the pointer to the last object; |
| $ap.start | the current object; |
| $ap.off | the current offset from the start; |
| $ap.length | the length of the current object. |

The encoding process will now be described in greater detail. The basic building block for encoding is the append command. The append command takes either already-encoded data in a variable, or not-yet-encoded data as a literal string. The normal use of append is to ASN.1 encode some data and append it to a variable. The format of the data in the argument (in direct mode) depends on the encoding format.

The append command also accepts variables, in which case it assumes that the variable's contents are already ASN.1 encoded. The append command can be used in this way to give encoded values a SEQUENCE or SET wrapper.

The last append command mode is where the data to be encoded comes not from a direct argument, but is instead a reference to an object owned by the calling C program. The reference name is preceded by a leading '$'. The reference must be created before it is used, by the C program calling a register function.

Append commands are used to create a variable containing one or more encoded primitive objects. Creating the outer SEQUENCE wrappers is done with the append or final commands.

The external command allows the script to call out to a function in the outer C program. The function must have been registered by the C program before it is used. An example would be to take some encoded data and encrypt it, then encode it and embed it in some more encoded stuff.

The final assembly of the script's encoded output must be in the special variable "outvar". The C API used by the calling program knows how to retrieve the data in it.

The command syntax will now be described in detail:

The command syntax: new <var> instantiates a named variable.

The command syntax: append <var> <tag> <data> appends encoded data, with tag <tag>, to a variable. Data is either a string that represents the data pre-encoding ("direct" appending), a variable containing some encoded data, or is a tag into a data structure ("indirect" appending). Examples of "direct" and "indirect" appending will now be described.

First, an example of direct append commands is described. The command append version UNIVERSAL|PRIMITIVE|INTEGER "0" encodes the value "0" as an INTEGER and appends it to the variable version. The command append tmp UNIVERSAL|PRIMITIVE|OID "1 2 840 113549 1 1 2" encodes the OID "1 2 840 113549 1 1 2" as ASN.1 and appends the results to the variable tmp.

Second, an example of appending already-encoded data is described. The command append version CONSTRUCTED|SEQUENCE tmp where a variable tmp containing some encoded data is encoded as a CONSTRUCTED SEQUENCE, and that encoded data is appended to the variable version.

Third, an example of an indirect append command is described. The command append signature INTEGER $signature where $signature refers to an object in a data structure that the encoder can refer to in order to find the data.

For direct append commands, the format of the data argument depends on the encoding format. INTEGER assumes a string containing the ASCII values of the INTEGER to be encoded, OID assumes an OID in printed-out format, and so on.

The command format final <var> <tag> <data> finalizes a constructed type. Data is another variable containing the contents to be encoded.

The command format sub <routine name> ([var name . . . ]) defines a subroutine. Subroutines can expect variables to be passed in. If there are not enough variables placed on the stack by the caller, there is an error.

The command format call <routine name> <output var> <value> [value . . . ] calls a routine, placing its results in output var. Multiple values can be passed to the routine. Values can be "strings" surrounded by quotes, or variables. Subroutines must be called with the right number of arguments.

The command format external <function name> <output var> <input var> [<input var> . . . ] defines the external command as a way to call out into the calling C program. The calling program can register functions which are wrappers to C code. The C wrapper can call some access functions to allow it to read and write to data in variables accessible to the script. An example would be a call to a function to sign a value using RSA.

The following is an example of encoding:

```
new version
append version UNIVERSAL|PRIMITIVE|INTEGER "0"
new tmp
append tmp UNIVERSAL|PRIMITIVE|OID "1 2 3 4 5 3498349"
append version CONSTRUCTED|SEQUENCE tmp
free tmp
write UNIVERSAL|PRIMITIVE|INTEGER - "2" $version
```

-continued

```
close CONTEXT|CONSTRUCTED 0 $version
sub rdnoid(val,string) {
    new seq
    new tmp
    append tmp UNIVERSAL|PRIMITIVE|OID val
    append tmp UNIVERSAL|PRIMITIVE|PRINTABLESTRING string
    final seq CONSTRUCTED|SEQUENCE tmp
    final seq CONSTRUCTED|SET set
    return seq
}
call rdnoid foo "2 2 43 4 0" "string".
```

The currently described embodiment is implemented in a digital computing system (not shown) having memory for storing the scripts, parser/interpreter modules, and data and including a CPU for executing the scripts and other program code. The methods and acts described can be embodied as program code stored in a computer readable media, such as magnetic media, CD Rom or semiconductor memory, with the program code being executed by the CPU.

The invention has now been described with reference to various embodiments and examples. Alternatives and substitutions will now be apparent to persons of ordinary skill in the art. For example, as is known in the art, the particular syntax or linked data structure described is not required to practice the invention. The invention finds general utility in applications requiring encoding and decoding data between a data structure (C, C#, Visual Basic, etc. data structure) and on-the-wire data formats. Further, the parser/interpreter can be coded in other languages than C. Accordingly it is not intended to limit the invention except as provided by the appended claims.

What is claimed is:

1. A computer program product comprising a computer readable medium for causing a computer to decode interchange format data into structured data, the computer program product comprising:
   a decoding script, comprising a sequence of decoding commands, where the decoding script saves objects in the interchange data in a linked list, where each node in the linked list is a structure holding name, type, length, and data fields derived from a corresponding object in the interchange format data, and with each node in the linked list able to reference peer and subordinate nodes, where a peer node saves an object at the same level as a referencing node and a subordinate node saves an object at a next lower level than the referencing node, with the decoding script for controlling the decoding of interchange format data objects into structured data; and
   a decoder/parser module, responsive to the decoding commands, for decoding and structuring the interchange format data according to the decoding script.

2. The computer program product of claim 1 where said decoding script further comprises:
   a test command for performing different procedures depending on a type or tag value of an object.

3. The computer program product of claim 1 where the decoding script further comprises:
   an access command that accesses data held in a specified node of the linked list.

4. A method for decoding interchange format data into structured data, the method comprising:
   at the receiver:
   executing a decoding script, including a sequence of decoding commands, where the decoding script saves objects in the interchange data in a linked list, where each node in the linked list is a structure holding name, type, length, and data fields derived from a corresponding object in the interchange format data, and with each node in the linked list able to reference peer and subordinate nodes, where a peer node saves an object at the same level as a referencing node and a subordinate node saves an object at a next lower level than the referencing node, with the decoding script for controlling the decoding of shared interchange format data objects into structured data, with the sequence of decoding commands for controlling the creation of a data structure from the interchange format data objects; and responsive to the decoding commands, decoding and structuring the interchange format data objects according to the decoding script.

5. The method of claim 4 where executing decoding script further comprises:
   executing a test command for performing different procedures depending on a type or tag value of an object.

6. The method of claim 2 where the step of decoding the interchange format data includes the steps of:
   executing an access command that accesses data held in a specified node of the linked list.

7. A method for decoding a message, with a message including a sequence of components, some components formed by other sequences of components, and where each component may include a type field, a length field, and a tag field, into a data structure comprising a linked list of list elements, with each list element including a peer pointer, a subordinate pointer, and name, type, and length fields, where the structure of the linked list is determined by a sequence of instructions in a script, with the method comprising the steps of:
   (a) decoding a current component in the message;
   (b) executing a current command in a script;
   (c) if the current first command is a save command, where a save command indicates a name, a type, and whether the next component is a peer or subordinate to the present command:
      (c).(i) saving the type and length in a current linked list element; and
      (c).(ii) if a next component is a peer, creating a peer pointer pointing to a next list element in a current linked list, else, creating a subordinate pointer pointing to the next list element in the current linked list;
   (d). if the current command is a skip command:
      (d).(i) skipping to the next component;
   (e). if the current command is a test command including a test condition, where a test command specifies a first action to be taken if a test condition is true and a second action to be taken if a test condition is false:
      (e).(i) determining the test condition and, depending on whether the test condition is true, performing either the first or second action.

8. The method of claim 7 further comprising the steps of:
   (f). if the current command is call subroutine command:
      (f).(i) executing a subroutine comprising save, skip, test, and call subroutine commands.

9. A computer program product for causing a computer to decode structured data interchange format data objects into structured data, the computer program product comprising:
   a computer usable medium having computer readable program code physically embodied therein, said computer program product further comprising:
   computer readable program code comprising a decoding script, including a sequence of decoding commands, where the decoding script saves objects in the interchange data in a linked list, where each node in the linked list is a structure holding name, type, length, and data fields derived from a corresponding object in the interchange format data, and with each node in the linked list able to reference peer and subordinate nodes, where a peer node saves an object at the same level as a referencing node and a subordinate node saves an object at a next lower level than the referencing node, with the decoding script for controlling the decoding of shared interchange format data objects into structured data;

computer readable program code, responsive to the decoding commands, for causing the computer to decode and structure the interchange format data objects according to the decoding script.

10. A method for encoding and decoding structured data for sharing between sender and receiver, the method comprising:

at the sender:

executing an encoding script, where the encoding script includes commands for encoding specified data into interchange data format and appending encoded data to a variable or appending already encoded data to a variable, with the encoding script capturing the encoding of the structured data into interchange format data objects;

at the receiver:

executing a decoding script, including a sequence of decoding commands, where the decoding script saves objects in the interchange data in a linked list, where each node in the linked list is a structure holding name, type, length, and data fields derived from a corresponding object in the interchange format data, and with each node in the linked list able to reference peer and subordinate nodes, where a peer node saves an object at the same level as a referencing node and a subordinate node saves an object at a next lower level than the referencing node, with the decoding script for controlling the decoding of shared interchange format data objects into structured data, with the sequence of decoding commands for controlling the creation of a data structure from the interchange format data objects; and responsive to the decoding commands, decoding and structuring the interchange format data objects according to the decoding script.

11. A computer program product for causing a computer to encode and decode between structured data interchange format data objects and structured data for sharing between sender and receiver, the computer program product comprising:

a computer usable medium having computer readable program code physically embodied therein, said computer program product further comprising:

computer readable program code comprising an encoding script, comprising a sequence of encoding commands, where the encoding script includes commands for encoding specified data into interchange data format and appending encoded data to a variable or appending already encoded data to a variable, with the encoding script capturing the encoding of the structured data into interchange format data objects, with the encoding script including a sequence of encoding commands;

computer readable program code, responsive to encoding commands, for causing the computer to encode the structured data as interchange format data objects according to the encoding script;

computer readable program code comprising a decoding script, including a sequence of decoding commands, where the decoding script saves objects in the interchange data in a linked list, where each node in the linked list is a structure holding name, type, length, and data fields derived from a corresponding object in the interchange format data, and with each node in the linked list able to reference peer and subordinate nodes, where a peer node saves an object at the same level as a referencing node and a subordinate node saves an object at a next lower level than the referencing node, with the decoding script for controlling the decoding of shared interchange format data objects into structured data; and computer readable program code, responsive to the decoding commands, for causing the computer to decode and structure the interchange format data objects according to the decoding script.

* * * * *

UNITED STATES PATENT AND TRADEMARK OFFICE
CERTIFICATE OF CORRECTION

PATENT NO. : 7,243,341 B2  Page 1 of 1
APPLICATION NO. : 10/136055
DATED : July 10, 2007
INVENTOR(S) : Eric Murray It is certified that error appears in the above-identified patent and that said Letters Patent is hereby corrected as shown below:

In column 8, line 21, please replace "2", with --4--

Signed and Sealed this

Thirteenth Day of May, 2008

JON W. DUDAS
*Director of the United States Patent and Trademark Office*